United States Patent
Ikäheimo et al.

(10) Patent No.: US 8,134,261 B2
(45) Date of Patent: Mar. 13, 2012

(54) COOLING ARRANGEMENT FOR AN ELECTRICAL MACHINE

(75) Inventors: Jouni Ikäheimo, Kurikka (FI); Jere Kolehmainen, Merikaarto (FI); Jari Pekola, Vantaa (FI); Tommi Ryyppö, Espoo (FI)

(73) Assignee: ABB Oy, Helsinki (FI)

( * ) Notice: Subject to any disclaimer, the term of this patent is extended or adjusted under 35 U.S.C. 154(b) by 146 days.

(21) Appl. No.: 12/373,181

(22) PCT Filed: Jul. 13, 2007

(86) PCT No.: PCT/FI2007/000191
§ 371 (c)(1),
(2), (4) Date: Feb. 5, 2009

(87) PCT Pub. No.: WO2008/006934
PCT Pub. Date: Jan. 17, 2008

(65) Prior Publication Data
US 2010/0133933 A1 Jun. 3, 2010

(30) Foreign Application Priority Data
Jul. 14, 2006 (FI) .................................. 20060684

(51) Int. Cl.
*H02K 9/00* (2006.01)
(52) U.S. Cl. ........................................ 310/62; 310/58
(58) Field of Classification Search .............. 310/62, 310/58, 52, 64
See application file for complete search history.

(56) References Cited

U.S. PATENT DOCUMENTS

| | | | |
|---|---|---|---|
| 2,043,655 A | 6/1936 | Ehrmann | |
| 2,515,973 A | 7/1950 | Abbott | |
| 2,604,501 A * | 7/1952 | Wightman | 310/63 |
| 3,383,529 A * | 5/1968 | Baumann et al. | 310/52 |
| 3,610,975 A * | 10/1971 | Onjanow | 310/57 |
| 4,742,257 A * | 5/1988 | Carpenter | 310/62 |
| 5,789,833 A | 8/1998 | Kinoshita et al. | |
| 6,891,290 B2 * | 5/2005 | Nagayama et al. | 310/58 |
| 2006/0055254 A1 | 3/2006 | Pellegrino | |

FOREIGN PATENT DOCUMENTS

| | | |
|---|---|---|
| DE | 925 596 C | 3/1955 |
| GB | 467527 A | 6/1937 |
| GB | 518207 A | 2/1940 |
| GB | 798693 A | 7/1958 |
| JP | 2001-045725 A | 2/2001 |

OTHER PUBLICATIONS

Form PCT/ISA/210 (International Search Report) dated Oct. 29, 2007.
Form PCT/ISA/237 (Written Opinion of the International Searching Authority).
Finnish Search Report (with English language translation of category of cited documents) dated Jan. 9, 2007.

* cited by examiner

*Primary Examiner* — Nguyen N Hanh
(74) *Attorney, Agent, or Firm* — Buchanan Ingersoll & Rooney PC

(57) ABSTRACT

A cooling arrangement is disclosed for an electrical machine in which the main cooling air circulation within the machine is arranged using a centrifugal blower in at least one of the ends of the machine, making the main cooling air circulation flow through at least an air space in the machine and the outer surface of the stator. A circulating fan is arranged in the immediate vicinity of the centrifugal fan for the purpose of generating a coil end circulation that circulates air at least in the area of the machine's coil ends.

4 Claims, 2 Drawing Sheets

COOLING ARRANGEMENT FOR AN ELECTRICAL MACHINE

Figure 1:
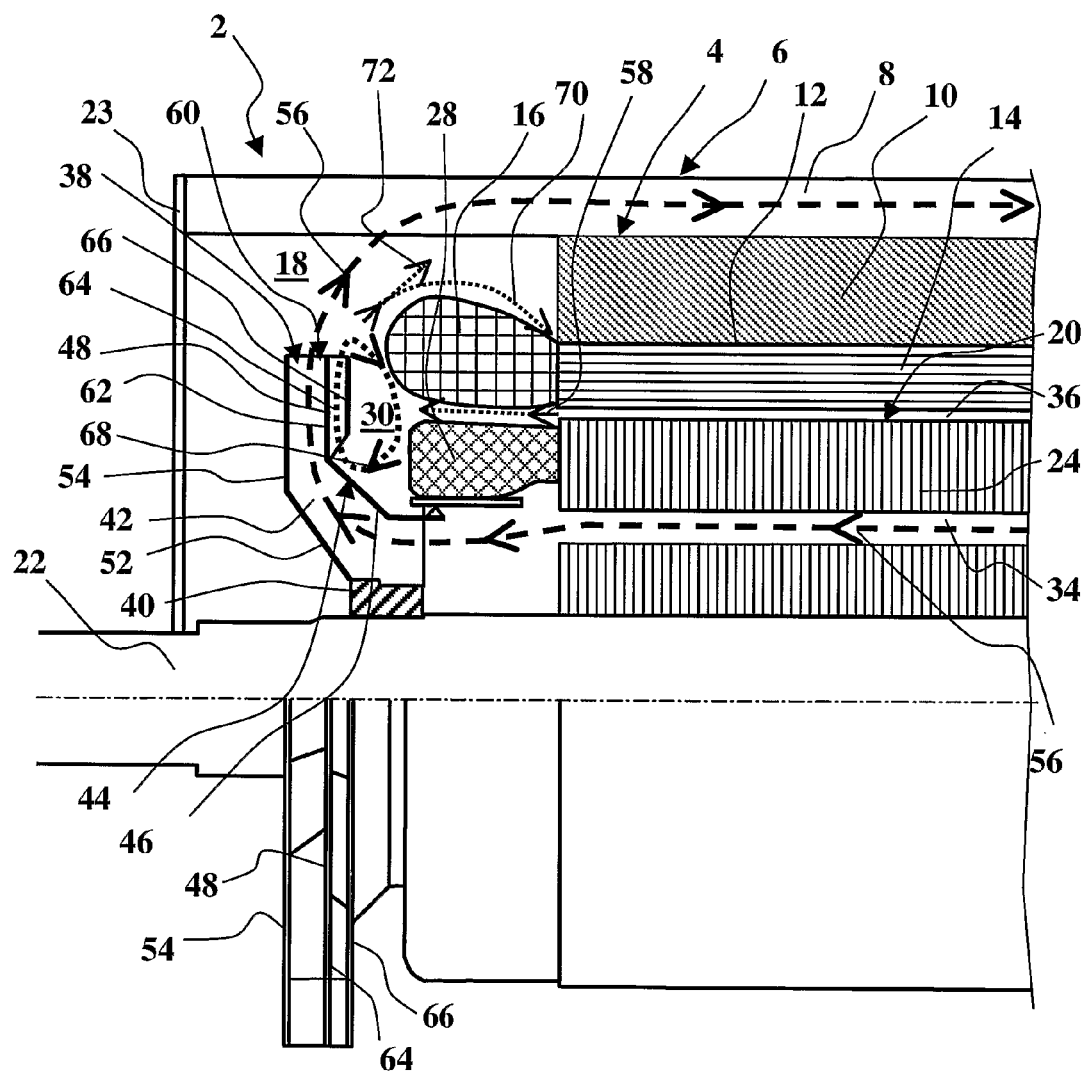

The object of the invention is a cooling arrangement for an electrical machine according to the preamble of claim 1.

It is important for the efficient and safe operation of an electrical machine that the temperature of all components of the machine is within the design range. An electrical machine warms up due to the resistance of coil conductors, commutators or other current supply devices, losses in the magnetic circuit, eddy currents and bearing friction. The need for cooling an electrical machine varies greatly depending on its structure, operating method and dimensioning. Air cooling is a commonly used cooling method in which a fan or similar device is used to convey cooling air through the machine or along its outer surface. Air cooling with internal as well as external circulation is known from prior art. The efficiency of air cooling is improved by a heat exchanger as necessary. Heating is locally improved at locations that warm up the most and at which the flow of cooling air is insufficient as such.

The important parts of an electrical machine requiring cooling include the coil ends of the stator and rotor windings. The coil conductors carry the armature or excitation current of the electrical machine, and the associated resistance losses warm up the winding. At the stator and rotor slots, the dissipated heat is conducted to the iron within the magnetic circuits but within the coil end area, the conductors are only covered by a relatively thin layer of insulator that has a limited capacity for transferring heat. The cooling of the coil ends has been improved by heat exchangers, liquid cooling, as well as extra fans and air deflectors. These methods are efficient and useful in terms of cooling but often lead to complex and expensive special arrangements.

The objective of the present invention is to create a novel and advantageous cooling arrangement for an electrical machine that is simple and economical to implement and that ensures sufficient cooling effect at the coil end. In order to achieve this, the invention is characterised by the features specified in the characteristics section of claim 1. Certain other preferred embodiments of the invention are characterised by the features listed in the dependent claims.

The solution according to the invention improves the efficiency of cooling the coil ends in an advantageous way. In an electrical machine with internal air circulation, the coil ends at the end of the machine that has a higher cooling requirement are provided with greater air flow, conveying the thermal dissipation generated in the coil conductors at the coil end into the cooling air. According to the invention, a centrifugal fan draws air through the rotor along cooling channels in the rotor. A circulating fan circulates air around the coil end, which improves the cooling of the coil end.

According to an embodiment of the invention, the circulating fan is integrated into the centrifugal fan. The circulation of cooling air within the machine is controlled and cooling is directed to necessary locations, while the space required for the fans in the longitudinal direction of the machine is almost equal to that required for the circulating fan. This feature is further emphasised when the centrifugal fan comprises an outer deflector plate and an inner deflector plate perpendicular to the shaft, and the circulating fan is attached to the inner deflector plate.

According to another characteristic of the invention, a part of the coil end circulation is arranged to be guided to the main circulation, and a part of the main circulation is arranged to be guided to the coil end circulation. This means that the air flowing in the air gap of the machine that has warmed up only slightly will mix into the coil end circulation, facilitating the cooling of the coil end, and correspondingly, air that has warmed up in the coil end circulation will join the main circulation and cool down when flowing through the cooling fins.

Figure 2:
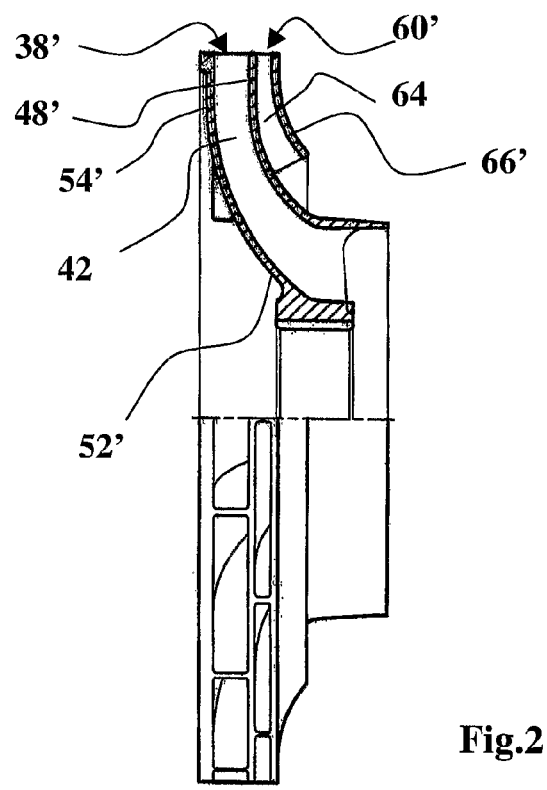
Figure 3:
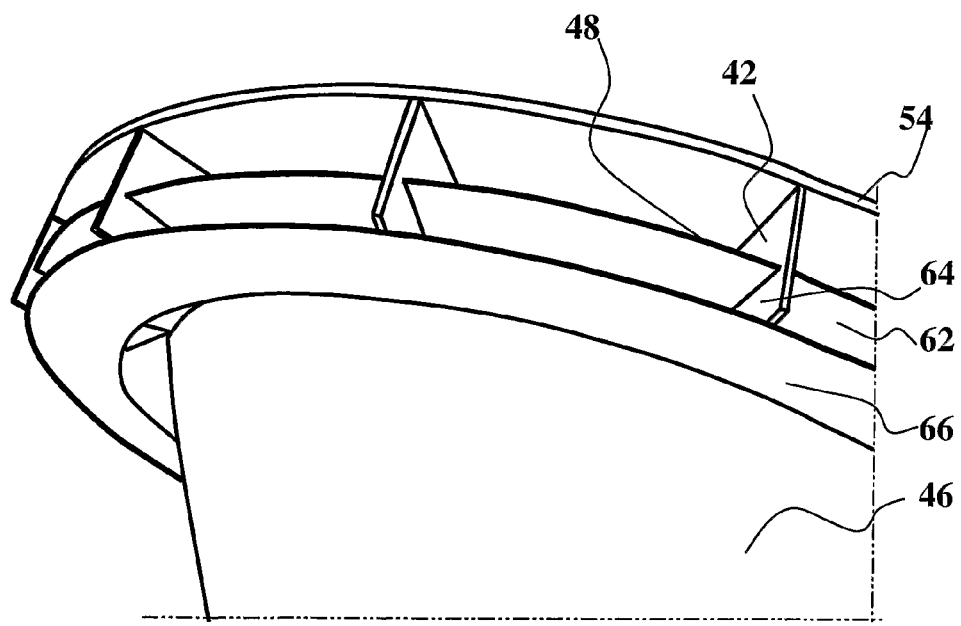

The invention will be described in the following with the help of a certain embodiment by referring to the enclosed drawings, where FIG. 1 illustrates a partial cross-section of the end of an electrical machine according to the invention, FIG. 2 illustrates a fan according to the invention, and FIG. 3 illustrates a perspective sketch of a fan structure according to the invention.

A schematic illustration of an embodiment of the invention is provided in FIG. 1, in which one of the ends of the electrical machine 2 is illustrated as a partial cross-section of the part above the centreline and the area below the centreline only illustrates the fan and the rotor with its coil ends. It must be understood that only the parts of the electrical machine 2 are illustrated that are required for understanding and implementing the invention.

The stator 4 of the electrical machine is attached to the machine frame 6, and cooling fins 8 are fitted onto the outer circumference. Slots 12 for stator windings 14 are formed in the magnetic core 10 of the stator. At the end of the stator, the coil ends 16 of the stator windings extend out of the magnetic core into the air space 18 at the end of the electrical machine. Instead of cooling fins, the outer edge of the stator may have air channels through which the cooling air flow is routed. The channels may be on the outer surface of the stator or inside the stator, in which case holes are separately made in the stator, or the air channels may be on the bottom of the stator winding slots.

The rotor 20 of the electrical machine is fitted onto the shaft 22 of the machine, which is supported by bearings on the frame 6 of the machine through the end plate 23 of the machine, for example. The rotor comprises the rotor's magnetic core 24 in which slots have been formed for the rotor winding, and the coil ends 28 of the rotor winding extend to the air space 30 at the end of the rotor, outside the rotor core 24. Cooling air channels 34 have been made in the rotor core, extending through the rotor core 24 in the direction of the machine's shaft. Between the stator and the rotor there is the electrical machine's air gap 36 as is well known.

A centrifugal fan 38 is attached onto the shaft 22 of the machine outside the stator and rotor coil ends. The centrifugal fan is installed in the same air space that contains the coil ends, and it is used to circulate cooling air within the electrical machine. The fan is attached onto the shaft 22 by means of a keyway joint at the hub section 40. As is illustrated in more detail in FIG. 3, the centrifugal fan's blades 42 are attached to the hub section and extend radially to the outer edge of the fan. The edges of the blades 42 facing the rotor are fitted with the inner edge part 44 of the centrifugal fan 38. Within the inner edge part, the section 46 facing the shaft is conical, and the outer section 48 is perpendicular to the shaft of the machine. The edges of the blades 42 facing the end plate of the machine are fitted with the outer edge part 50 of the centrifugal fan, which is fitted onto the hub section 40 of the fan 38. The outer edge part 50 comprises a conical inner section 52 fitted onto the hub section 40 and an outer section 54 that is perpendicular to the shaft 22 of the machine.

The centrifugal fan 38 circulates the main cooling air circulation within the machine as illustrated by the dashed line 56 in FIG. 1. In the main cooling air circulation, air flows along the rotor's cooling channels 34 through the centrifugal fan 38 to the air space 18 at the end of the machine past the stator coil ends 16 to cooling fins 8 on the outer circumference of the electrical machine. At the other end of the electrical machine, which is not illustrated in FIG. 1, the main cooling air circulation flows past the coil ends to the rotor cooling channels 34. A minor part of the main cooling air circulation flows in the air gap 36 between the stator and the rotor, which is illustrated by the flow line 58.

A circulating fan 60 is formed in the edge part 44 of the centrifugal fan 38 facing the electrical machine, and the first edge part 62 of the circulating fan is formed by the back side of the outer section 48 of the centrifugal fan's inner edge part. The blades 64 of the circulating fan 60 extend from the first edge part 62 towards the coil ends of the electrical machine, and they are attached to the second edge part 66 of the circulating fan. The air flow generated by the circulating fan—that is, the coil end circulation—is illustrated by the dotted line 68 that primarily goes from the outer circumference of the circulating fan 60 past the coil ends 16 and 28 back to the inner circumference of the circulating fan or the intake opening. A part of the air flow goes around the coil ends through the base of the coil end and through any other gaps as illustrated by the dotted arrow 70. The circulating fan's air circulation is also merged with a share of the main circulation coming through the air gap, which is illustrated by the flow line 58. On the other hand, a part of the coil end circulation joins the main circulation 56 of the machine in the air space 18, which is illustrated by the arrow 72.

In the embodiment illustrated here, the centrifugal fan 38 and the circulating fan 60 are manufactured by welding the parts of the fans together. The blades of both fans are manufactured from integral pieces and thus extend from the outer edge part 54 of the centrifugal fan to the second edge part 66 of the circulating fan.

FIG. 2 illustrates another fan solution according to the invention. The edge parts of both the centrifugal fan 38' and the circulating fan 60' are shaped into a curvilinear form. The outer wall 52' facing the hub section of the centrifugal fan 38' is curved, and on the outermost edge 54', the outer wall bends substantially perpendicular to the shaft of the machine. On the outer circumference of the fan, the inner wall 48' of the centrifugal fan bends similarly to the outermost edge 54' of the outer wall. Correspondingly, the edge part 66' of the circulating fan 60' facing the machine is shaped into a curvilinear form. The blades 42 of the centrifugal fan 38' and the blades 64 of the circulating fan 60' correspond to the blades described in connection with FIG. 1.

In the above the invention has been described with the help of a certain embodiment. However, the description should not be considered as limiting the scope of patent protection; the embodiments of the invention may vary within the scope of the following claims.

The invention claimed is:

1. A cooling arrangement for an electrical machine comprising:
   a main cooling air circulation having a centrifugal fan at least in one end of the machine; and
   a coil end extending out of a sheet pack and the main cooling air circulation flowing through at least an air space associated with the coil end and an outer surface of a stator,
   wherein the centrifugal fan is fitted into the air space associated with the coil end,
   wherein a circulating fan is arranged in an immediate vicinity of the centrifugal fan for generating a coil end circulation that circulates air at least in an area of the coil ends, and
   wherein the centrifugal fan comprises an outer deflector plate and an inner deflector plate perpendicular to the shaft, and the circulating fan is attached to the inner deflector plate.

2. The arrangement according to claim 1, wherein the coil end circulation includes the stator and rotor coil ends.

3. The arrangement according to claim 1, wherein a part of the coil end circulation is guided to the main circulation, and a part of the main circulation is guided to the coil end circulation.

4. A cooling arrangement for an electrical machine comprising:
   a main cooling air circulation having a centrifugal fan at least in one end of the machine; and
   a coil end extending out of a sheet pack and the main cooling air circulation flowing through at least an air space associated with the coil end and an outer surface of a stator,
   wherein the centrifugal fan is fitted into the air space associated with the coil end,
   wherein a circulating fan is arranged in an immediate vicinity of the centrifugal fan for generating a coil end circulation that circulates air at least in an area of the coil ends, and
   wherein the main circulation flows substantially along a route: including rotor of the machine, centrifugal fan, air space in a first end of the machine, cooling fins on a frame, air space in a second end of the machine, rotor of the machine, and
   wherein the coil end circulation flows substantially along a route: including circulating fan, air space between the stator coil end and the fan, air space between the rotor coil end and the fan, circulating fan.

\* \* \* \* \*